United States Patent
Daubitz et al.

(10) Patent No.: US 12,491,756 B2
(45) Date of Patent: Dec. 9, 2025

(54) PASSENGER MOTOR VEHICLE HAVING IMPROVED SIDE IMPACT PROTECTION

(71) Applicant: Mercedes-Benz Group AG, Stuttgart (DE)

(72) Inventors: Andre Daubitz, Herrenberg (DE); Arno Disson, Sindelfingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 291 days.

(21) Appl. No.: 17/927,270

(22) PCT Filed: May 6, 2021

(86) PCT No.: PCT/EP2021/061944
§ 371 (c)(1),
(2) Date: Nov. 22, 2022

(87) PCT Pub. No.: WO2021/239427
PCT Pub. Date: Dec. 2, 2021

(65) Prior Publication Data
US 2023/0211652 A1    Jul. 6, 2023

(30) Foreign Application Priority Data
May 28, 2020   (DE) ............ 10 2020 003 194.3

(51) Int. Cl.
*B62D 25/02* (2006.01)
*B60J 5/04* (2006.01)
*B62D 21/15* (2006.01)

(52) U.S. Cl.
CPC .......... *B60J 5/0458* (2013.01); *B62D 21/157* (2013.01)

(58) Field of Classification Search
CPC ...... B62D 21/157; B62D 25/02; B60J 5/0422; B60J 5/0423; B60J 5/0429; B60J 5/0458;
(Continued)

(56) References Cited

U.S. PATENT DOCUMENTS 1,981,283 A * 11/1934 Perry ................. E05F 5/025
16/86 A
3,887,227 A    6/1975 Deckert
(Continued)

FOREIGN PATENT DOCUMENTS

| CN | 101031443 A | 9/2007 |
| CN | 101817369 A | 9/2010 |

(Continued)

OTHER PUBLICATIONS

Translation of KR19980037513A Description (Year: 1998).*
(Continued)

*Primary Examiner* — Amy R Weisberg
*Assistant Examiner* — Veronica M Condo
(74) *Attorney, Agent, or Firm* — Crowell & Moring LLP

(57) ABSTRACT

A passenger motor vehicle includes a body, a side door movable between a closed position and an open position, a side door fixing element, and a body stop element. The side door fixing element is disposed on the side door and the body stop element is disposed above the side door fixing element in a vertical direction of the passenger motor vehicle when the side door is in the closed position. The side door fixing element and the body stop element have an offset relative to each other in a transverse direction of the passenger motor vehicle when the side door is in the closed position. The side door is reshapeable as a result of an impact on the side door such that the side door fixing element is displaceable against the body stop element.

7 Claims, 4 Drawing Sheets

(58) Field of Classification Search
CPC ........ B60J 5/0437; B60J 5/0444; E05F 5/025; E05F 5/027
USPC .................................. 296/146.6, 146.9, 202
See application file for complete search history.

(56) References Cited

U.S. PATENT DOCUMENTS

| | | | |
|---|---|---|---|
| 5,000,509 A | | 3/1991 | Sinnhuber et al. |
| 5,306,067 A * | | 4/1994 | Hull ....................... B60J 5/0458 296/202 |
| 5,782,523 A * | | 7/1998 | Heldt ....................... B60J 5/043 296/187.12 |
| 6,207,911 B1 * | | 3/2001 | Hirsch ..................... E05F 5/025 200/61.81 |
| 7,156,454 B1 * | | 1/2007 | Dogan ....................... B60J 5/06 16/83 |
| 8,740,287 B2 * | | 6/2014 | Onda ..................... B60J 5/0458 296/193.06 |
| 8,960,768 B2 * | | 2/2015 | Kato ....................... B62D 25/04 296/187.12 |
| 9,150,084 B2 * | | 10/2015 | Makowski ............. B60J 5/0456 |
| 10,035,543 B2 * | | 7/2018 | Sato ....................... B62D 25/02 |
| 10,041,276 B2 * | | 8/2018 | Schoch ................ E05B 63/126 |
| 10,173,502 B2 * | | 1/2019 | Seong ................... B60J 5/0458 |
| 10,836,437 B2 | | 11/2020 | Murray et al. |
| 2003/0102697 A1 * | | 6/2003 | Yakata ................... B62D 25/04 296/209 |
| 2006/0130274 A1 * | | 6/2006 | Rieder .................... E05F 5/025 16/82 |
| 2008/0309120 A1 * | | 12/2008 | Kohlstrand ............... E05F 5/00 296/146.11 |
| 2010/0148535 A1 * | | 6/2010 | Takahashi .............. B60J 5/0429 296/187.12 |
| 2014/0059802 A1 * | | 3/2014 | Matsuki ................ E05C 17/203 16/82 |
| 2014/0117705 A1 * | | 5/2014 | Tamaki .................. B60J 5/0458 296/146.6 |
| 2014/0191535 A1 * | | 7/2014 | Sugiyama .............. B60J 5/0443 296/146.6 |
| 2015/0123427 A1 | | 5/2015 | Faruque et al. |
| 2017/0080979 A1 * | | 3/2017 | Sato ....................... B60J 5/0444 |
| 2017/0274744 A1 * | | 9/2017 | Hirakawa ............. B60J 5/0456 |
| 2018/0202212 A1 * | | 7/2018 | Xiao ......................... E05F 3/00 |
| 2019/0225276 A1 * | | 7/2019 | Nakashima ............ B62D 25/04 |
| 2023/0175300 A1 * | | 6/2023 | Yun ......................... E05F 5/025 296/193.01 |
| 2024/0001741 A1 * | | 1/2024 | Kim ....................... B60J 5/0437 |

FOREIGN PATENT DOCUMENTS

| | | |
|---|---|---|
| CN | 102402153 A | 4/2012 |
| DE | 10 2011 101 533 A1 | 12/2011 |
| EP | 0 642 940 B1 | 3/1995 |
| EP | 1918140 A2 | 5/2008 |
| FR | 2212246 A1 | 7/1974 |
| FR | 2418111 A1 | 9/1979 |
| FR | 2 939 752 A1 | 6/2010 |
| JP | 57-48115 U | 3/1982 |
| JP | 3-53309 U | 5/1991 |
| KR | 19980037513 A | 8/1998 |

OTHER PUBLICATIONS

Translation of CN 101031443A description (Year: 2007).*
German-language German Office Action issued in German application No. 10 2020 003 194.3 dated Apr. 18, 2023 (Six (6) pages).
PCT/EP2021/061944, International Search Report dated Aug. 13, 2021 (Two (2) pages).
German-language German Office Action issued in German application No. 10 2020 003 194.3 dated Mar. 2, 2021 (Six (6) pages).
Office Action issued in Chinese Patent Application No. 202180038300.7 dated Mar. 5, 2025, w/English translation, 14 pages.

* cited by examiner

PASSENGER MOTOR VEHICLE HAVING IMPROVED SIDE IMPACT PROTECTION

BACKGROUND AND SUMMARY OF THE INVENTION

The invention relates to a passenger motor vehicle having an improved side impact protection.

The requirements for passenger motor vehicles regarding an improved impact protection, in particular side impact protection, are steadily increasing. This means that despite increased energy input into the passenger motor vehicle, the protection of the passengers must still be ensured. In particular in the case of a side impact involving an increased speed and an increased mass of a passenger motor vehicle that causes the side accident, there is a danger of the side door being pulled over the side sill of the passenger motor vehicle, which leads to increased intrusions into the passenger space. Door hinges and a lock of the depressed side door can fail here, in particular break, such that they may burst open. The motor vehicle interior is thus open in the case of a crash. Arms and legs of the passengers can come out through the opening, and objects can get into the interior, which increases the danger of injury for the passengers during the accident.

A side door of a passenger motor vehicle that is arranged at least partially covering a side sill bordering a door opening of the body in its door base region—seen in relation to a closed position in the transverse direction of the motor vehicle—arises from DE 10 2011 101 533 A1. The side door has a reinforcing element in this region, which, in the event of a side impact, displaces the side door on the side sill, in particular in the covered region, in the case of an accidental application of force running at least substantially in the transverse direction of the motor vehicle and acting from the outside inwards on the side door, and which finally hooks or wedges onto the side sill by forming a form fit, whereby the side door is prevented from being pulled over the side sill, or the extent to which this occurs can be reduced to a certain amount. The forces acting on the door hinges and the door lock are still very high here, however, such that the danger of a failure cannot be ruled out.

A motor vehicle having a side door that is provided with a catching lug that protrudes through an opening in a side sill into a cavity of the same, in which a hook element is provided, when the side door is closed, arises from US 2015/0123427 A1. In the case of a side collision, the side door is reshaped in the direction of a passenger space, wherein the hook element engages with the catching lug due to the reshaping of the side door, and thus fixes the side door to the side sill in a low region.

A side door of a passenger motor vehicle is known from EP 0 642 940 B1, wherein the side door is provided with a strengthening profile, onto which a catching hook is screwed on the lateral border region of the side door. Its hook portion is assigned to a trough-shaped recess in a body column in the closed position of the side door, wherein the free end of the hook portion lies approximately in the plane of the facing outer side of the body column. If a force is directed against the side door, then the free end of the hook portion glides over the outer side of the body column with high friction, whereby a bulge-like elevation can be created. The intrusion depth of the side door into the motor vehicle interior is thus substantially reduced. The fixing or the burrowing of the hook portion into the body column occurs in the longitudinal direction of the motor vehicle, i.e., the x direction of the motor vehicle coordinate system, however, and specifically only in the forward direction, while the hook portion glides out of the recess in the event of a front impact and an associated backward displacement of the side door. The problem remains, however, that the side door can be pulled over the longitudinal member during a side impact, whereby the danger arises of a breakage, in particular of the lock of the side door, whereby the side door can no longer be safely held in the closed position.

The object of the invention is therefore to create a passenger motor vehicle in which an improved side impact protection is attained without significantly increasing the total weight of the passenger motor vehicle.

A passenger motor vehicle having the features herein is provided to solve the object. This passenger motor vehicle comprises a body and at least one side door that can be moved, in particular pivoted, between a closed position and an open position, wherein a side door fixing element is provided on a free border region of the at least one side door. The passenger motor vehicle is characterized in that a body stop element arranged above the side door fixing element in the vertical direction of the motor vehicle is provided on a supporting motor vehicle column of the body, which is arranged spaced apart from the side door fixing element in the vertical direction of the motor vehicle, and thus in the z direction of the motor vehicle coordinate system, when the side door is arranged in the closed position, in that the side door fixing element and the body stop element have an offset relative to each other in the transverse direction of the motor vehicle when the side door is in the closed position, and in that if the side door fixing element is reshaped as a result of an impact of a collision partner on the side door, the side door fixing element can be displaced against the body stop element.

The side door can be opened and closed without these elements touching due to this arrangement of the side door fixing element in relation to the body stop element. The side door fixing element is supported on the body stop element in the event of a side impact on the side door, however, whereby a shifting of the side door in the vertical direction of the motor vehicle (z direction) is practically avoided. A slight or marginal raising of the side door occurs at most as a result of its intrusion, and thus reshaping in the direction of a passenger space of the passenger motor vehicle, until the side door fixing element hits the stop element on the body. A further raising of the side door in the z direction of the passenger motor vehicle is thus prevented by means of the passive side door fixing element, which only acts in the event of a crash. It remains to be noted that the side door preferably hits the body or a stop element provided on the body exclusively only in one direction, specifically the vertical direction of the motor vehicle (z direction), and the other directions of movement of the side door, specifically the longitudinal direction of the motor vehicle (x direction) and the transverse direction of the motor vehicle (y direction) are preferably not restricted. In the embodiment according to the invention, it is particularly advantageous that the side door can reshape in the event of a crash. A side wall of the body, the connecting part of the side door on the side wall, hinges and locking clamps are thus protected, and the basic components of the door, in particular a door frame and strengthening elements and profiles installed on it, for example a side impact protection profile (SIP profile) are advantageously required to bend. A tearing of the door hinges, locking clamps, door components and welded and/or adhesive connections in the basic construction of the door is thus avoided. Overall, although at least a certain degree of intrusion of the side door cannot be avoided, it is nevertheless guaranteed that many components are reshaped in the event of a crash, and thus as much crash energy as possible is removed, due to the embodiment according to the invention of the side door or of the body.

It is further advantageous that an overloading of a lock of the side door can be avoided, and thus a force bond between the side door and the body of the passenger motor vehicle remains intact.

Due to the design already described above, specifically that the side door fixing element and the body stop element only come into contact in the event of an accident, the two elements can be designed without adjustment and thus are not noise related.

In a particularly preferred embodiment of the invention, it is provided that the body stop element is arranged in the vertical direction of the motor vehicle above the side door fixing element. This means that even in the case of an undamaged side door in the closed position, a certain covering already exists between the side door fixing element and the body stop element in the transverse direction of the motor vehicle. It is thus ensured that a hit of the side door fixing element on the body stop element is guaranteed even in the event of an intrusion of the side door that is already relatively low, and the side door fixing element cannot glide past the body stop element in the vertical direction of the motor vehicle in any circumstances.

An exemplary embodiment is further particularly preferred in which when the undamaged side door is displaced between its closed position and open position, the side door fixing element passes the body stop element without touching. The side door fixing element and the body stop element thus have a height offset relative to each other in the vertical direction of the motor vehicle at least in the closed position of the side door.

An exemplary embodiment of the passenger motor vehicle is further preferred which is characterized in that in the event of a reshaping of the side door caused by an impact of a collision partner on the side door, the side door fixing element can be displaced in the transverse direction of the motor vehicle in the direction of a passenger space against a further stop present on the body. This stop can be a part of the body side wall and/or a body column, for example. In this embodiment too, a certain relative movement of the side door in the longitudinal direction of the motor vehicle is still possible.

Because the side door fixing element and the body stop element have a height offset relative to each other in the vertical direction of the motor vehicle (z direction) and a transverse offset relative to each other in the transverse direction of the motor vehicle (y direction) in an operating position and/or closed position of the side door, it is in particular achieved that the side door fixing element and the body stop element can be guided past each other without touching in a normal operation when the side door is opened or closed.

According to a development of the invention, it is provided that the operating connection between side door fixing element and body stop element does not consist of a tensile bond and/or does not consist of a form-fit operating connection. It is thus in particular prevented that regions and/or components of the side door are exposed to an excessive wear, which could lead to a destruction and/or weakening of an integrity of the side door. It is in particular possible that energy of an accident can be removed due to a reshaping of the side door, and an excessive displacement of the side door in the vertical direction of the motor vehicle is also prevented. In other words, however, a displacement of the side door in directions other than the vertical direction of the motor vehicle is not prevented, whereby it is enabled that in particular connecting parts, such as the lock and the hinges, are protected, and the side door is only required to bend. The accident energy can thus be advantageously removed. The strain for welded and adhesive connections of a basic component of the side door is additionally reduced by the reshaping of the side door.

According to a development of the invention, it is provided that the side door fixing element and the body stop element are a passive fixing element and stop element. Here it is in particular required that these elements do not engage with each other or work together when the side door is opened and/or closed, and also do not have to be separately moved by means of an actuator in the event of a crash.

The supporting motor vehicle column of the body, on which the body stop element is provided, can for example be an A column or a B column or a C column. The columns of the body are in particular particularly suitable for introducing forces in the vertical direction of the motor vehicle.

According to a development of the invention, it is provided that the side door fixing element is arranged on the side door underneath in the installation position of the side door, and the corresponding location on the body is correspondingly arranged on a column foot of the A column or B column or C column. The region of the column foot of a column of the body in connection with the side sill arranged on it is in particular particularly suitable for absorbing forces, in particular in the vertical direction of the motor vehicle, without itself being deformed to a significant extent.

According to a development of the invention, it is provided that the side door fixing element and/or the body stop element is fixed by means of screws, pins and/or nuts, whereby further strengthening elements are preferably provided for increasing stability, and wherein nuts for fixing the side door fixing element are preferably welded and/or adhered onto the side door in the case of a side door produced by means of sheet metal construction and/or a sliding block having a threaded hole is inserted through a hole in an extruded profile, in particular transversely, in the case of a side door produced from extruded profiles. The side door element and/or the body stop element are thus stably designed, in particular in connection with the strengthening elements, in such a way that the currently required forces also act without deforming the elements to a significant extent.

According to a further development of the invention, it is provided that the body stop element is designed as a hinge element, in particular a lower hinge element of the side door. It is thus in particular achieved that no further components are required, for which reason the effect according to the invention can be attained particularly easily and cost-effectively.

The invention is explained in more detail in the following by reference to the drawings.

DETAILED DESCRIPTION OF THE DRAWINGS

Figure 1A:
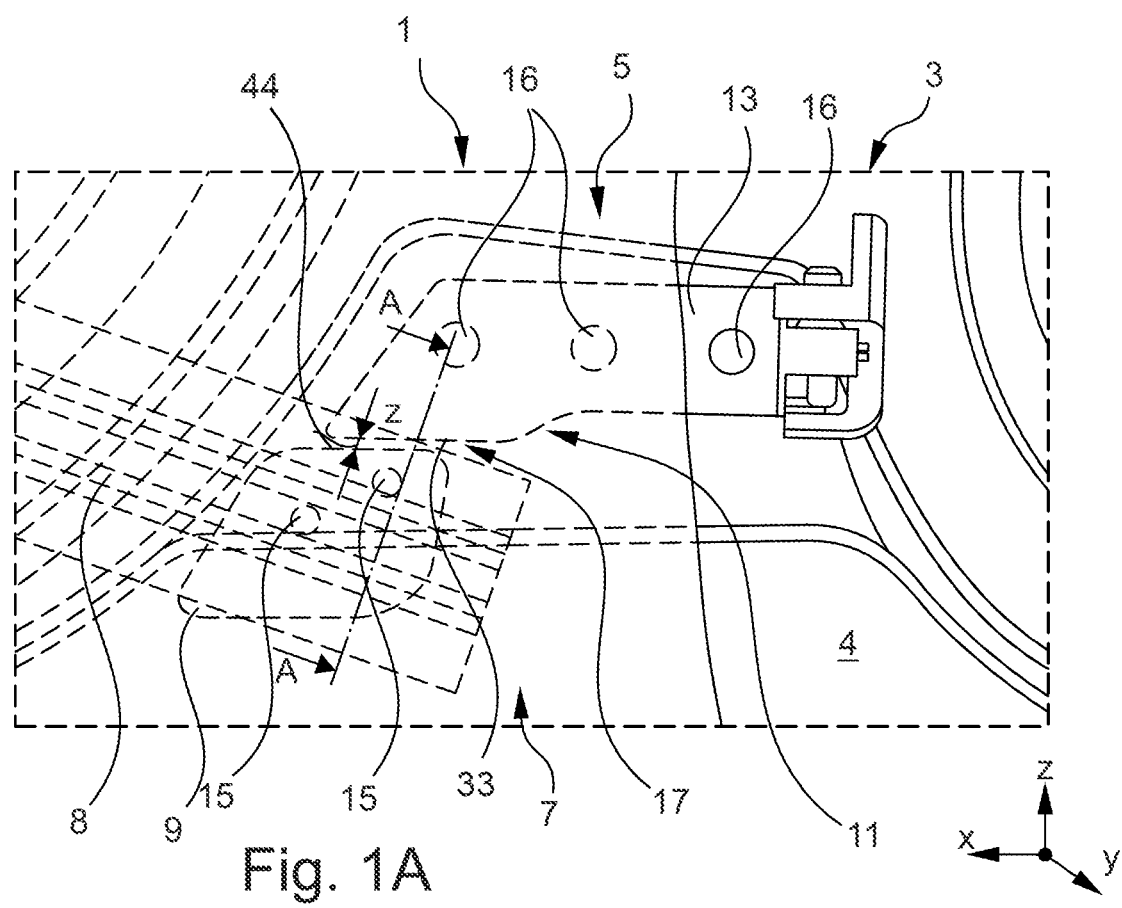
FIG. 1A shows a first exemplary embodiment of the passenger motor vehicle in a schematic depiction.

The same parts are provided with the same reference numerals in the figures, such that reference is thus made to the preceding description.

FIG. 1A should be understood as a first exemplary embodiment of a passenger motor vehicle 1 in a schematic depiction, having a body 3 and at least one side door 5. Only one part of a body column 4 of the body 3 can be seen, which is a so-called B column. In the depiction according to FIG. 1A, only the column foot of the B column can be seen. The side door 5 is here a so-called front door of the passenger motor vehicle 1, which preferably has four doors in this exemplary embodiment. Only the lower, back corner region of the front door surrounded by a dashed line can be seen.

Figure 2A:
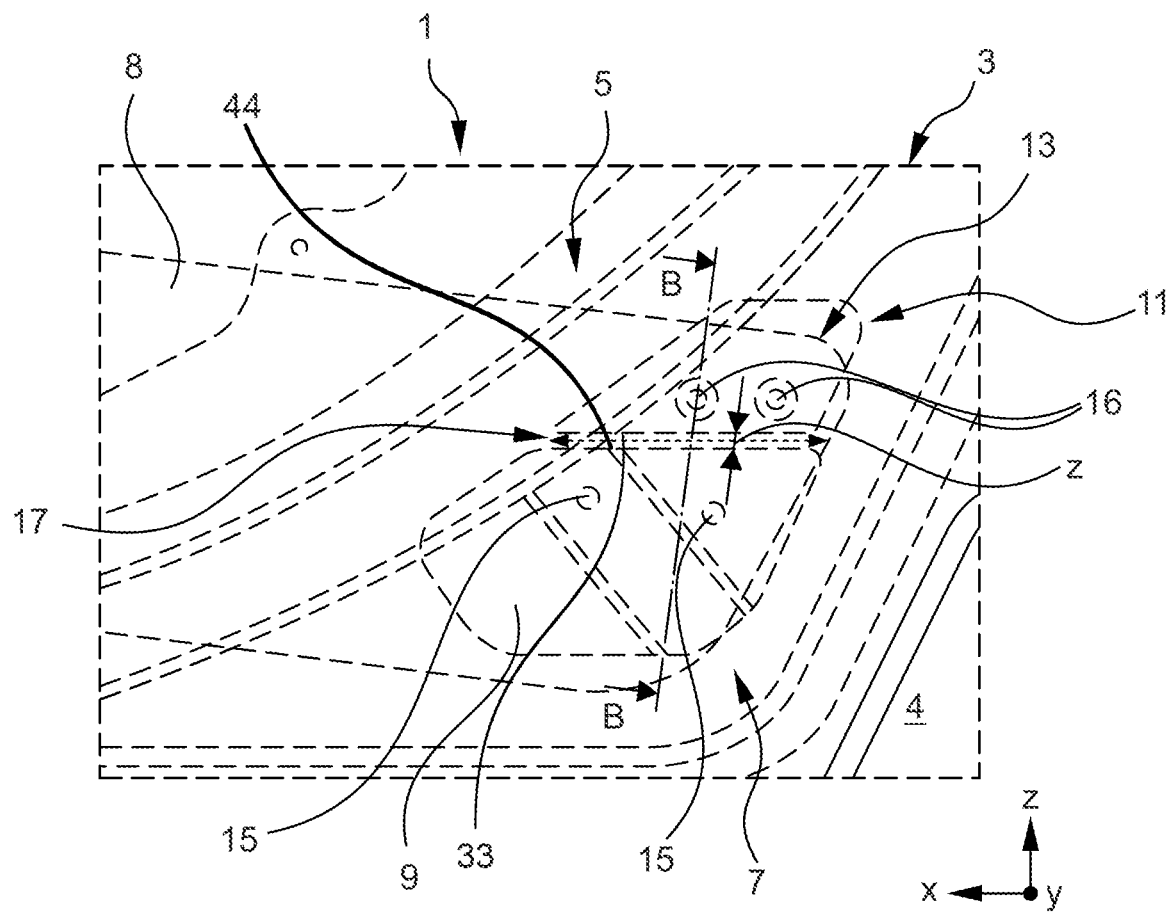
FIG. 2A shows a second exemplary embodiment of the passenger motor vehicle in a schematic depiction.

FIG. 2A accordingly shows a portion of the passenger motor vehicle 1 according to FIG. 1A or of a different passenger motor vehicle in the region of a further exemplary embodiment of the side door 5, which is a rear door, of which only the lower, back corner can be seen. The body column 4 is thus a so-called C column, of which only the column foot can be seen. The passenger motor vehicle 1 is here designed having at least four doors.

A side door fixing element 9 is arranged on a free border region 7 of the side door 5, specifically in its lower, back corner region. The side door fixing element 9 works together with a body stop element 13 arranged on a location 11 of the body 3 corresponding to the side door fixing element 9 of the side door 5 in the closed position of the side door 5 in such a way that the at least one side door 5 having the side door fixing element 9 can be opened and closed past the body stop element 13 of the body 3 without touching in a normal operation of the side door 5, and in an accident situation the side door fixing element 9 is supported by the body stop element 13 via a reshaping, in particular intrusion of the side door 5 in the direction of a passenger space, and thus seen in the direction of the image plane of FIGS. 1A and 2A, such that a displacement of the side door 5 in the vertical direction of the motor vehicle (z direction) is largely prevented.

Another strengthening element 8 can be seen in FIG. 1A, also described as a side impact protection profile (SIP profile), which runs obliquely downwards into the corner region of the side door 5 at least in its back end. The strengthening element 8 is attached to the basic construction of the door, and thus to the door support structure frame. This here occurs on or near the side door fixing element 9.

In the exemplary embodiment according to FIG. 1A, the body stop element 13 is designed as or on a hinge element, in particular as a lower hinge element, wherein it serves for the pivot-moveable mounting of a rear door of the passenger motor vehicle 1 (not depicted in FIG. 1A). This differs from the exemplary embodiment according to FIG. 2A, in which the body stop element 13 is designed as a plate-shaped element, in particular a stop plate, which is set on the body column 4 from outside, or is designed on it in some instances.

It should further in particular be understood from FIGS. 1A and 2A that the side door fixing element 9 and the body stop element 13 in an operating position and/or closed position of the side door 5 have a height offset 17 relative to each other in the vertical direction of the motor vehicle (z direction), such that a spacing or a gap having the height z is created between these when the side door 5 is closed.

Figure 1B:
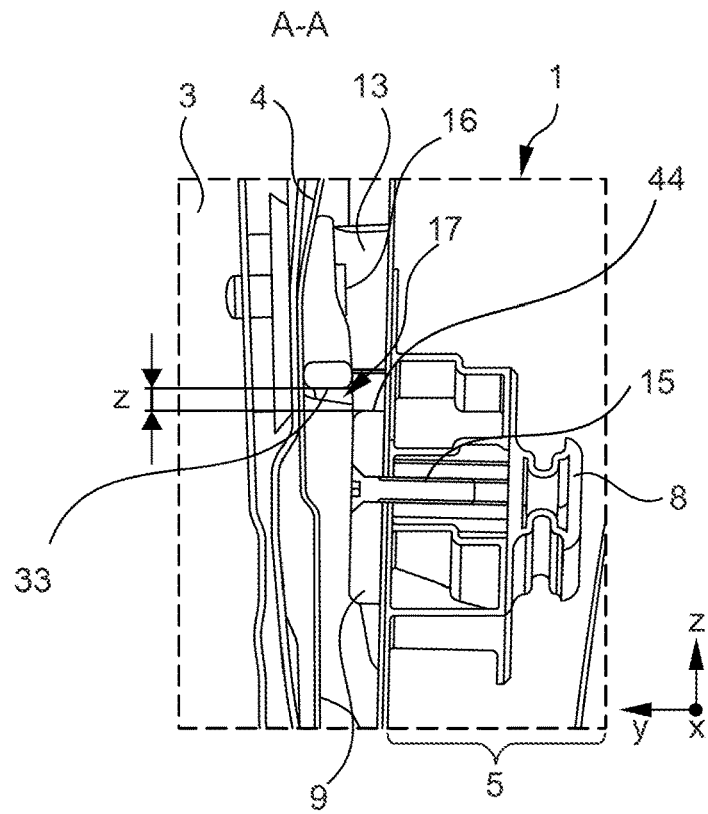
FIG. 1B shows a cross section through the first exemplary embodiment of the passenger motor vehicle from FIG. 1A along the section line A-A in a schematic depiction.
Figure 2B:
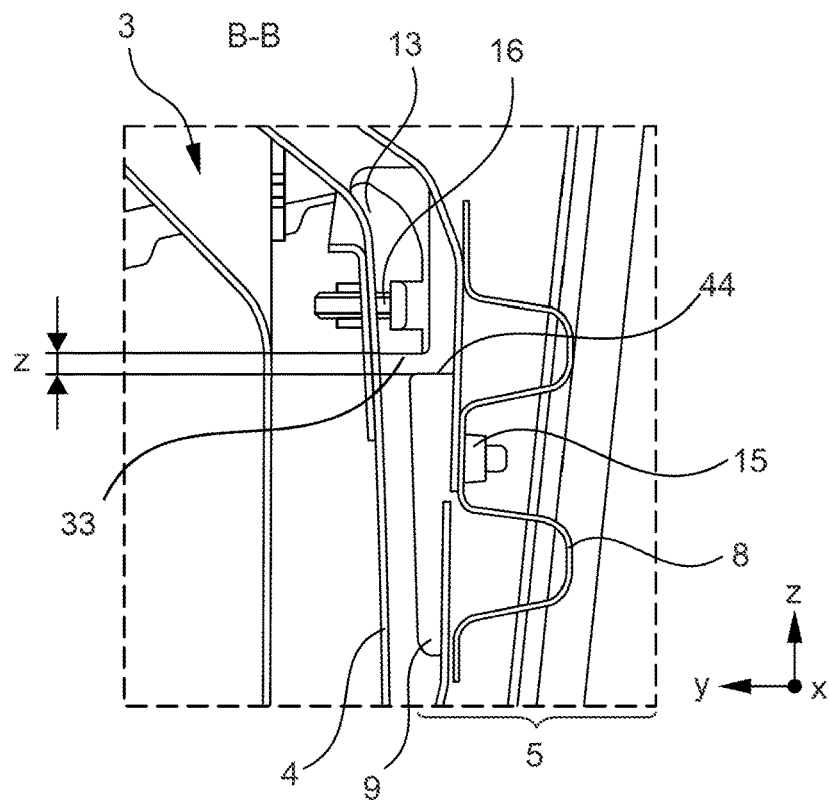
FIG. 2B shows a cross section through the second exemplary embodiment according to FIG. 2A along the section line B-B in a schematic depiction.

It should further in particular be understood from FIGS. 1B and 2B that the side door fixing element 9 and the body stop element 13 in an operating position and/or closed position have a transverse offset relative to each other, i.e., an offset in the transverse direction of the motor vehicle (y direction in the motor vehicle coordinate system). Here it is provided in the exemplary embodiment according to FIG. 1B that the y-offset of the side door fixing element 9 is so great that when the side door 5 is closed, there is no covering in the z direction, i.e., upwards between this side door fixing element and the body stop element 13. This differs from the exemplary embodiment according to FIG. 2B, in which the side door fixing element 9 is arranged already slightly covering the body stop element 13 in the z direction when the side door 5 is closed. The two exemplary embodiments have in common that the side door fixing element[s] 9 are arranged spaced apart from the body 3 or its body column 4, and so do not hit there.

In FIGS. 1A and 2A, the side door 5 is further shown cross-hatched, as otherwise the components lying geometrically underneath it in relation to the image plane would be covered by the side door 5 like side door fixing element 9 or the body stop element 13.

It should in particular be understood from FIGS. 1A, 1B and 2B that the side door fixing element 9 and the body stop element 13 are stationarily fixed to the side door or the body 3 by means of screws, pins and/or nuts 15 or 16. Here nuts are preferably welded and/or adhered to the side door 5 for fixing the side door fixing element 9 in the case of a side door 5 produced by means of sheet-metal construction. A sliding block (not shown in the figures) having a threaded hole (not shown in the figures) is inserted through a hole in an extruded profile of the side door 5, in particular transversely, in the case of a side door 5 produced from extruded profiles.

Figure 1C:
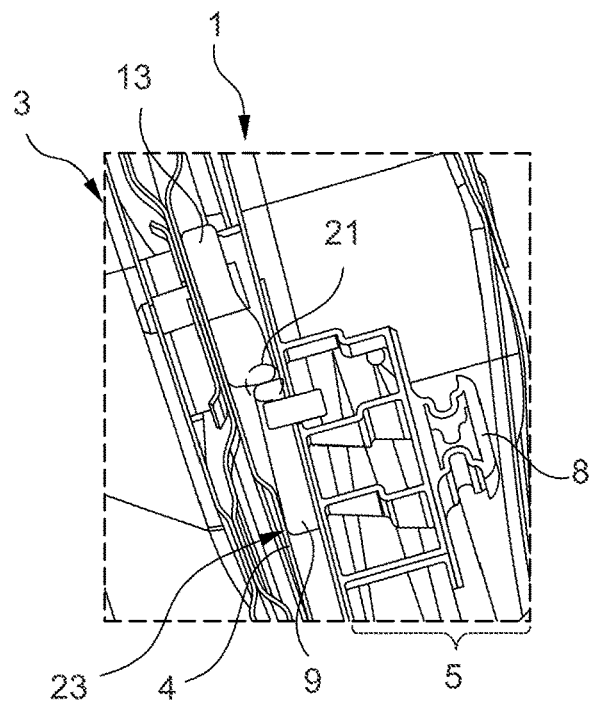
FIG. 1C shows the cross section through the first exemplary embodiment according to FIG. 1B in a schematic depiction, wherein the schematic depiction from FIG. 1C depicts the situation after an accident.
Figure 2C:
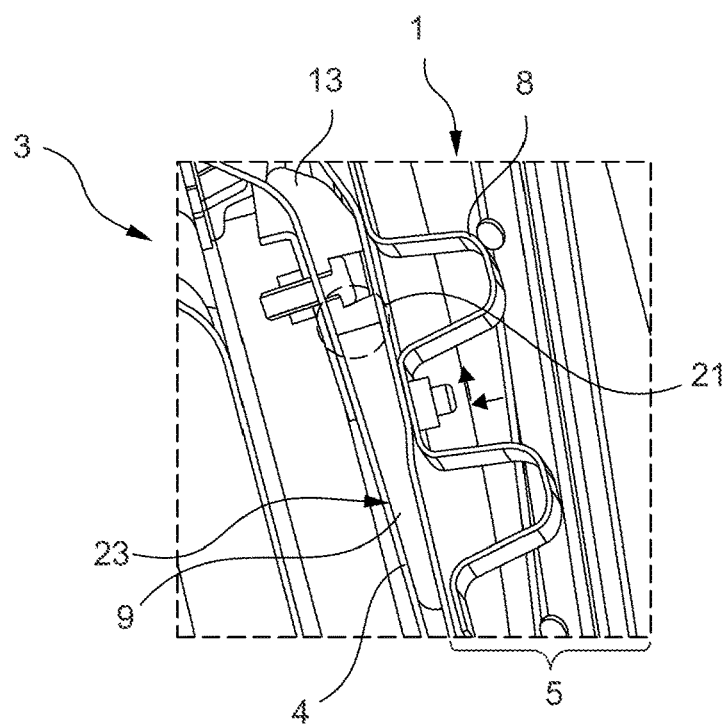
FIG. 2C shows the cross section according to FIG. 2B in a schematic depiction, wherein, in comparison with FIG. 2B, an accident situation is shown.

Additionally, it should be understood from the FIGS. 1C and 2C, for the first or second exemplary embodiment of the passenger motor vehicle 1 respectively, how the side door fixing element 9 and the body stop element 13 are supported by each other in an accident situation, in particular the side door fixing element 9 on the body stop element 13, in such a way that a displacement of the side door 5 in the vertical direction of the motor vehicle z is prevented.

The manner in which the side door fixing element 9 and the body stop element 13 work together during or in the event of a side impact on the side door 5 is explained in more detail in the following. The side door 5 will reshape in the direction of the motor vehicle interior, and thus in particular in the direction of a passenger space, as a result of a correspondingly significant impact of a collision partner on the side door 5. The side door fixing element 9 arranged in the lower border region of the side door 5 is displaced further in the transverse direction of the motor vehicle y due to this intrusion of the side door 5, but also simultaneously in the z direction, and thus in the vertical direction of the motor vehicle, as a result of which the side door fixing element 9, here having an abutment contact surface 44, hits the body stop element 13, here having an abutment mating contact surface 33, after the height spacing z between side door fixing element 9 and body stop element 13 is bridged. This abutment contact region is circled in FIGS. 1C and 2C, and provided with the reference numeral 21. It should also be recognised that the side door fixing element 9 also abuts on the body 3, here the respective body column 4 and is also supported here in this stop position. This abutment contact region is provided with the reference numeral 23.

In the exemplary embodiments of the passenger motor vehicle according to the invention shown in FIGS. 1A to 2C, the abutment contact surface 44 of or on the side door fixing element 9 and the abutment mating contact surface 33 of or on the body stop element 13 are each designed evenly. The alignment of the contact surfaces 33 and 44 to each other is in parallel or substantially in parallel. In the exemplary embodiments depicted in the figures, it is further provided that the contact surfaces 33 and 44, respectively stretching in an x and y direction of the motor vehicle coordinate system, lying in an imagined plane, are arranged in parallel or substantially in parallel to an imagined horizontal. Alternatively, the contact surfaces 33 and 44 can also be arranged obliquely to the imagined horizontal, wherein they are preferably angled in the direction of the side door, and thus falling in the direction of its centre. The arrangement and design of the abutment contact surface 44 and the abutment mating contact surface 33 in each case is preferably such that the abutment contact surface 44 of the side door fixing element 9 is brought against the abutment mating contact surface 33 of the body stop element 13, and abuts on the latter—preferably extensively or completely—when the abutment contact surface 44 of the side door fixing element 9 is displaced following a reshaping of the side door in the direction of the passenger space caused by a collision, as shown in FIGS. 1C and 2C. In the case of ongoing intrusion, and thus reshaping of the side door in the direction of the vehicle interior when absorbing parts of the crash energy, the abutment contact surface 44 and the abutment mating contact surface 33 can glide on or off each other, meaning in particular that the abutment contact surface 44 on the side door moving inwards depending on reshaping can glide off the abutment mating contact surface 33 without the side door being displaced in the z direction. It thus remains to be noted that the abutment contact surface 44 and the abutment mating contact surface 33 are designed and arranged in such a way that a relative movement between side door and motor vehicle column is enabled, specifically in the x direction of the motor vehicle coordinate system. The distance at which this relative movement can take place can be limited by means of a stop acting in the x direction (not depicted in the figures). This is not necessary in all cases, however.

In summary, it remains to be noted that the movement of the side door 5 in the z direction caused by a crash is limited by the side door 5 hitting the body stop element 13. An excessive strain of the locking lugs of a door locking device can be avoided as a result of this embodiment, and the force bond to the body columns in the lock region can thus be maintained. It is important that the two supporting elements (side door fixing element 9 and body stop element 13) can only come into contact with each other in the event of a crash, such that these do not need to be adjusted/aligned to each other in any form when the side door is mounted.

It still remains to be noted that a reshaping of the side door inwards is permitted without the side door being able to slide upwards over the side sill (not depicted) bordering the door opening in the body due to the covering of side door fixing element 9 and body stop element 13 in the x direction.

The invention claimed is:
1. A passenger motor vehicle (1), comprising:
   a body (3);
   a side door (5), wherein the side door (5) is movable between a closed position and an open position;
   a side door fixing element (9), wherein the side door fixing element (9) is disposed on a free border region (7) of the side door (5); and
   a body stop element (13), wherein the body stop element (13) is disposed above the side door fixing element (9) in a vertical direction of the passenger motor vehicle and is disposed on a supporting motor vehicle column of the body (3) which is arranged spaced apart from the side door fixing element (9) in the vertical direction of the passenger motor vehicle when the side door (5) is in the closed position;
   wherein the side door fixing element (9) and the body stop element (13) have an offset relative to each other in a transverse direction of the passenger motor vehicle (1) when the side door (5) is in the closed position;
   wherein the side door (5) is reshapeable as a result of an impact on the side door (5) such that the side door fixing element (9) is displaceable against the body stop element (13);
   wherein an entirety of the body stop element (13) is disposed above an entirety of the side door fixing element (9) in the vertical direction of the passenger motor vehicle in the closed position such that there is a gap (z) between the body stop element (13) and the side door fixing element (9) in the vertical direction in the closed position and wherein the body stop element (13) and the side door fixing element (9) can only come into contact with each other as a result of the impact on the side door (5).

2. The passenger motor vehicle (1) according to claim 1, wherein when the side door (5) is moved between the closed position and the open position, the side door fixing element (9) passes the body stop element (13) without touching.

3. The passenger motor vehicle (1) according to claim 1, wherein in an event of a reshaping of the side door (5) caused by an impact on the side door, the side door fixing element (9) is displaceable in the transverse direction of the passenger motor vehicle (1) in a direction of a passenger space against a stop on the body stop element (13).

4. The passenger motor vehicle (1) according to claim 1, wherein the side door fixing element (9) has an abutment contact surface (44) which is displaceable against an abutment mating contact surface (33) of the body stop element (13) via a reshaping of the side door (5) caused by an impact on the side door and wherein the abutment contact surface (44) and the abutment mating contact surface (33) are configured such that, despite abutment contact therebetween, a relative movement between the side door fixing element (9) and the body stop element (13) is possible due to a gliding off along the abutment mating contact surface (33) and the abutment contact surface (44).

5. The passenger motor vehicle (1) according to claim 1, wherein the side door fixing element (9) is a passive fixing element and the body stop element (13) is a stop element.

6. The passenger motor vehicle (1) according to claim 1, wherein the side door fixing element (9) is disposed on a lower corner region of the side door (5) and wherein the body stop element (13) is disposed on a column foot (23) of the supporting motor vehicle column.

7. The passenger motor vehicle (1) according to claim 1, wherein the body stop element (13) is a lower hinge element of the side door (5).

* * * * *